3,169,131
PROCESS FOR THE PREPARATION OF 4-FLUORO-HYDROCORTISONE, 21-ACYLATES AND 16-SUB-STITUTED DERIVATIVES THEREOF, AND INTERMEDIATES PRODUCED IN THE PREPARATION THEREOF
Fred Kagan, Kalamazoo, and Barney J. Magerlein, Portage Township, Kalamazoo County, Mich., assignors to The Upjohn Company, Kalamazoo, Mich., a corporation of Delaware
No Drawing. Filed Mar. 29, 1963, Ser. No. 269,183
14 Claims. (Cl. 260—397.1)

This invention relates to certain novel steroids; it is particularly concerned with a novel process for the preparation of the physiologically active final product, 4-fluoro-11β,17α,21-trihydroxy-4-pregnene-3,20-dione, the corresponding 21-acylates thereof, the intermediates produced in the preparation of these compounds and their corresponding 16α- and 16β-methyl, fluoro and chloro derivatives. The intermediates obtained by employing the new process, namely, alkyl 4α-fluoro-3,11-diketo-5,17(20)-[cis]-pregnadien-21-oate, alkyl 4-fluoro-3,11-diketo-4,17-(20)-[cis]-pregnadien-21-oate, 4-fluoro-11β,21-dihydroxy-4,17(20)-[cis]-pregnadien-3-one, the corresponding 21-acylates thereof and the 16α- and 16β-methyl, fluoro and chloro derivatives of all of the foregoing also possess physiological activity similar to that of the aforesaid final product.

The novel compounds and process of this invention are illustratively represented by the following sequence of formulae:

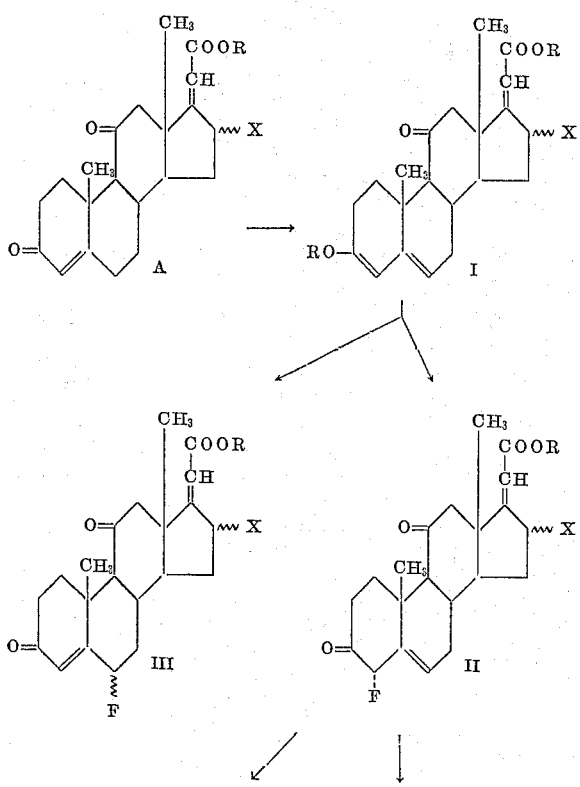

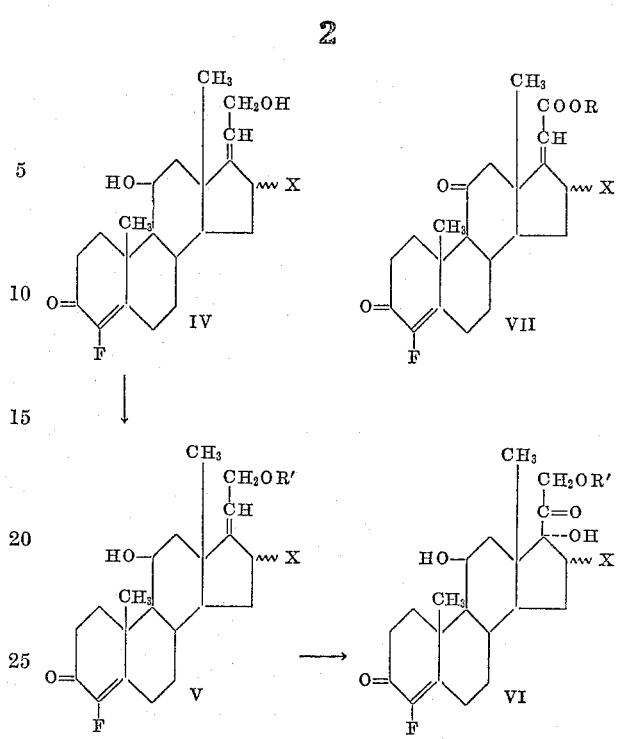

wherein R is a lower-alkyl radical containing from one to eight carbon atoms, inclusive; R' is the lower-acyl radical of a hydrocarbon carboxylic acid containing from one to twelve carbon atoms, inclusive; X is selected from the group consisting of hydrogen, methyl, fluorine and chlorine; ~ is a generic expression denoting α- and β-bonds and mixtures thereof.

As used in this application, the Roman numerals following the name of a compound (or compounds) indicates the relation of the compound (or compounds) to the reaction scheme shown above.

The process for the preparation of 4-fluoro-11β,17α,21-trihydroxy-4-pregnene-3,20-dione (VI'), the 21-acylates thereof (VI) and the intermediates therefor, namely, alkyl 4α-fluoro-3,11-diketo-5,17(20)-[cis]-pregnadien-21-oate (II), 4-fluoro-11β,21-dihydroxy-4,17(20)-[cis]-pregnadien-3-one (IV) and the 21-acylates thereof (V) comprises the following steps:

(1) An alkyl, 3,11-diketo-4,17(20)-[cis]-pregnadien-21-oate (A) (prepared as in U.S. Patent 2,752,366) is converted to the corresponding 3-enol ether, an alkyl 3 - alkoxy - 11 - keto - 3,5(6),17(20) - [cis] - pregnatrien-21-oate (I), by known methods, e.g., by reaction with a trialkyl orthoformate in the presenece of a catalyst such as p-toluenesulfonic acid.

(2) The thus produced 3-enol ether (I) is reacted with approximately one molar equivalent of perchloryl fluoride to produce an alkyl 4α-fluoro-3,11-diketo-5,17(20)-[cis]-pregnadien-21-oate (II) plus an alkyl 6(α and β)-fluoro-3,11 - diketo - 4,17(20) - [cis] - pregnadien - 21 - oate (III). This is conveniently achieved by bubbling perchloryl fluoride gas into a solution of the selected 3-enol ether (I) in a solvent inert to the aforesaid gas at the reaction temperature, e.g., benzene, toluene, diethyl ether, tetrahydrofuran, dioxane, dimethyl sulfoxide, chloroform, etc., at a temperature between about −75° C. to the boiling point of the reaction mixture, with a range of −10 to +10° C. being preferred. Alternatively, a solution of perchloryl fluoride in one of the above-enumerated solvents can be mixed with a solution of the 3-enol ether (I). Reaction time varies with the reaction temperature, e.g., from a few minutes to several hours.

(3) The thus produced alkyl 4α - fluoro - 3,1 - diketo-5,17(20)-[cis]-pregnadien-21-oate (II) is isomerized by treatment with acid, e.g., anhydrous hydrogen chloride, to yield an alkyl 4-fluoro-3,11-diketo-4,17(20)-[cis]-pregnadien-21-oate (VII).

(4) The alkyl 4α - fluoro - 3,11 - diketo - 5,17(20) - [cis]-pregnadien-21-oate (II) is converted to 4-fluoro-11β,21 - dihydroxy - 4,17(20) - [cis] - pregnadien - 3 - one (IV) in accordance with the procedures of U.S. Patent 2,781,343. In this manner a compound of Formula II is first transformed to a 3 - amino - 11 - keto-3,5,17(20)-[cis]-pregnatrien-21-oic acid alkyl ester by reaction with a secondary alkylene amine (e.g., pyrrolidine) preferably in the presence of an acid catalyst (e.g., p-toluenesulfonic acid); reduction of the thus produced 3 - amino - 3,5,17(20) - triene, e.g., with lithium aluminum hydride, yields a 3-amino-11β,21-dihydroxy-3,5,17(20)-[cis]-pregnatriene; hydrolysis of the thus produced 11β-21-dihydroxy derivative, e.g., with methanol and sodium hydroxide, gives 4-fluoro-11β,21-dihydroxy-4,17(20)-[cis]-pregnadien-3-one (IV).

(5) The compound of Formula IV is subjected to an esterification reaction involving the conversion of the 21-hydroxy group of 4 - fluoro - 11β,21 - dihydroxy - 4,17(20)-[cis]-pregnadien-3-one (IV) to a 21-acyloxy group in order to protect the 21-function from degradation in the next step, i.e., the oxidative hydroxylation. This esterification can be performed under the esterification conditions known in the art, e.g., by the reaction of (IV) with the selected acid halide or the anhydride of an organic carboxylic acid, or by reaction with the selected acid in the presence of an esterification catalyst, or with an ester under ester exchange reaction conditions, to give a 4-fluoro-11β,21-dihydroxy-4,17(20)-[cis]-pregnadien-3-one 21-acylate (V).

(6) The thus produced ester (V) is oxidatively hydroxylated with osmium tetroxide and an oxidizing agent, e.g., hydrogen peroxide, an organic peracid, an amine oxide peroxide or an aryl iodo oxide, in the manner described in U.S. Patents 2,769,825, 2,769,823 and J. Amer. Chem. Soc., 77, 4436 (1955) to produce the corresponding 4 - fluoro - 11β,17α,21 - trihydroxy - 4 - pregnene - 3,20 - dione 21-acylate (VI). Hydrolysis of this compound (VI) by alkali, preferably in a nitrogen atmosphere, produces the free triol, 4-fluoro - 11β,17α,21 - trihydroxy-4-pregnene-3,20-dione (VI'). Esterification of the triol (VI') with halides and anhydrides of organic carboxylic acids or organic carboxylic acids containing from one to twelve carbon atoms, inclusive, gives a 4-fluoro-11β,17α,21-trihydroxy-4-pregnene-3,20-dione 21 - acylate (VI).

Following the procedures of steps (1) to (6) in the above process, but employing the known corresponding 16α- and 16β-methyl, fluoro and chloro derivatives of the starting materials of Formula A, yields the corresponding intermediates represented by Formulae I, II, III, IV, V and VII and the final products of Formulae VI and VI'.

The compounds of the present invention, i.e., alkyl 4α - fluoro - 3,11 - diketo - 5,17(20) - [cis] - pregnadien - 21-oate (II), 4 - fluoro - 11β,21 - dihydroxy - 4,17(20) - [cis]-pregnadien-3-one (IV), the 21-acylates thereof (V) and the 16α- and 16β-methyl, fluoro and chloro counterparts of the foregoing, are employed as intermediates in the preparation of the known products, 4 - fluoro - 11β,17α,21 - trihydroxy - 4 - pregnene - 3,20 - dione (VI'), the 21-acylates thereof (VI) and their corresponding 16α- and 16β-methyl, fluoro and chloro derivatives. All the hereinbefore named intermediates and final products exhibit marked anti-inflammatory activity. This physiologic property makes them useful in the treatment of various arthritic conditions and in the control of inflammatory diseases due to bacterial infections or allergic reactions of skin or mucous membranes.

The compounds represented by Formulae II, IV, V and VI of the flow-sheet shown above (and VI') can be prepared and administered to mammals, birds, and animals in a wide variety or oral and parenteral dosage forms, singly or in a mixture with other coacting compounds. They can be associated with a carrier which can be a solid material or liquid, in which the compound is dissolved, dispersed or suspended. The solid composition can take the form of tablets, powders, capsules or the like, preferably in unit dosage forms for simple administration or precise dosages.

EXAMPLE 1

*Methyl 3 - ethoxy - 11 - keto - 3,5(6),17(20) - [cis] - pregnatrien - 21 - oate (I)*

To a 5 l., 3-necked, round-1-bottom flask equipped with stirrer, condenser and heating mantle, there was added 750 g. of the known compound, methyl 3,11-diketo-4,17(20)-[cis]-pregnadien-21-oate (A), 1875 ml. of triethyl orthoformate and 37.5 g. of p-toluenesulfonic acid. The reaction mixture was heated to reflux temperature and 300 ml. of condensate removed over a period of about 30 minutes. Heating at reflux was continued for about an additional 15 minutes (until the reaction had gone to completion), after which the reaction mixture was allowed to cool to a temperature of about 40° C. About 1.5 l. of Skellysolve B (hexane hydrocarbons) was slowly added to the reaction mixture during vigorous stirring. After standing at between 5 to 10° C. for a period of about 15 hours the product was collected on a Büchner funnel by vacuum filtration, washed with about 500 ml. of Skellysolve B and dried under vacuum to yield 696 g. (86% yield) of pure methyl 3-ethoxy - 11 - keto-3,5(6)17(20)-[cis]-pregnatrien-21-oate (I) which had a melting point of 158 to 160° C. after drying in a vacuum oven at 50° C.

Following the procedure of Example 1 but substituting other alkyl 3,11-diketo-4,17(20)-[cis]-pregnadiene-21-oates (A) as starting material, and other trialkyl orthoformates for triethyl orthoformate, yields the corresponding alkyl 3-alkoxy-11-keto-3,5(6),17(20)-[cis]-pregnatrien-21-oates (I).

EXAMPLE 2

*Methyl 4α-fluoro-3,11-diketo-5,17(20)-[cis]-pregnadien-21-oate (II)*

Perchloryl fluoride gas was bubbled for a period of about 30 minutes through a solution of 300 g. of methyl 3-ethoxy-11-keto - 3,5(6),17(20) - [cis] - pregnatrien-21-oate (I) in 7.5 l. of tetrahydrofuran and 1.8 l. of water cooled to about 10° C., by which time fluorination was effected. The reaction mixture was evaporated under vacuum until the solution became turbid. At this juncture the crude crystalline product, methyl 4α-fluoro-3,11-diketo-5,17(20) - [cis] - pregnadien-21-oate (II) precipitated. Further concentration of the mother liquor led to the crystallization of methyl 6(α and β)-fluoro-3,11-diketo-4,17(20)-[cis]-pregnadien-21-oate (III).

Thirty grams of the crude product (II) was dissolved in 270 ml. of boiling methylene chloride and clarified by filtration. The solution was concentrated to a volume of about 200 ml. at atmospheric pressure and 300 ml. of boiling acetone added. Concentration was continued until crystals formed. The white crystals were collected by vacuum filtration and dried in vacuo at about 50° C. to give 25.4 g. of the desired product (II) having a rotation $[\alpha]_D$ of —9° (chloroform), a melting point of 208° C. (decomposition), ultraviolet absorption $$\lambda_{max.}^{EtOH} \ 223 \ m\mu, \ a_M \ 13,300$$

*Analysis.*—Calcd. for $C_{22}H_{27}FO_4$: F, 5.07. Found: F, 5.02.

After five crystallizations of material (II) prepared in a similar manner, pure crystalline methyl 4α-fluoro-3,11-diketo-5,17(20)-[cis]-pregnadien-21-oate (II) was obtained having a rotation $[\alpha]_D$ (chloroform) —20°; melting point of 208° C. (decomposition); ultraviolet absorption;

$$\lambda_{max.}^{EtOH} \ 222 \ m\mu$$

$a_M$ 13,050; infrared absorption (cm.$^{-1}$): C=O, 1739, 1710, 1705; C=C, 1668, 1645; C=O, 1210, 1160.

*Analysis.*—Calcd. for $C_{22}H_{27}FO_4$: C, 70.56; H, 7.27; F, 5.07. Found: C, 70.60; H, 7.15; F, 5.09.

Following the procedure of Example 2 but substituting other alkyl 3-alkoxy-11-keto-3,5(6),17(20)-[cis]-pregnatrien-21-oates (I) as starting material, yields the corresponding alkyl 4α-fluoro-3,11-diketo-5,17(20)-[cis]-pregnadien-21-oates (II).

EXAMPLE 3

*Methyl 4-fluoro-3,11-diketo-4,17(20)-[cis]-pregnadien-21-oate (VII)*

A solution of 2 g. of methyl 4α-fluoro-3,11-diketo-5,17(20)-[cis]-pregnadien-21-oate (II) in 100 ml. of chloroform was cooled to between about 0 to 5° C. Anhydrous hydrogen chloride gas was bubbled through the solution for a period of about 3 hours during which time the temperature of the reaction mixture was kept below 5° C., to complete isomerization of II. The solution was washed first with 10% potassium bicarbonate solution and then with water; the washings were combined and extracted with chloroform. The chloroform extracts were pooled, dried over anhydrous sodium sulfate and poured over a column of Florisil.

A crystalline fraction was eluted with Skellysolve B containing increasing amounts of acetone; these eluates were combined and recrystallized twice from acetone. The recrystallized product, methyl 4-fluoro-3,11-diketo-4,17(20)-[cis]-pregnadien-21-oate (VII) weighed 550 mg., had a rotation $[\alpha]_D$ of +176° (chloroform), an infrared absorption spectrum consistent with the proposed structure, ultraviolet absorption $$\lambda_{max.}^{EtOH} \ 237 \ m\mu$$

$a_M$ 20,200 and melted at 224.5 to 226.5° C.

*Analysis.*—Calcd. for $C_{22}H_{27}FO_4$: C, 70.57; H, 7.25; F, 5.07. Found: C, 70.58; H, 7.46; F, 4.90.

Following the procedure of Example 3 but substituting other alkyl 4α-fluoro-3,11-diketo-5,17(20)-[cis]-pregnadien-21-oates (II) as starting material, yields the corresponding alkyl 4-fluoro-3,11-diketo-4,17(20)-[cis]-pregnadien-21-oates (VII).

EXAMPLE 4

*4-fluoro-11β,21-dihydroxy-4,17(20)-[cis]-pregnadien-3-one (IV)*

(a) To a solution of 20 g. of methyl 4α-fluoro-3,11-diketo-5,17(20)-[cis]-pregnadien-21-oate (II) in 400 ml. of benzene at a temperature of about 60° C., 380 mg. of p-toluenesulfonic acid and 8.6 ml. of pyrrolidine was added under an atmosphere of nitrogen. The reaction mixture was heated until refluxing was attained and continued for a period of about one hour, the water formed being removed from the condensate by means of a water trap. The solvent was removed under vacuum, the bath temperature being kept below 45° C. The resulting solid residue was dissolved (while air was excluded) in 520 ml. of ether and 75 ml. of benzene. The solution was added slowly to a slurry of 6.2 g. of lithium aluminum hydride in 280 ml. of ether. After the addition was completed, the mixture was heated under reflux for about 1 hour, about 150 ml. of water slowly added and the organic solvents removed under vacuum. To the residue (while under an atmosphere of nitrogen) 640 ml. of methyl alcohol was added followed slowly by 3 g. of sodium hydroxide in 60 ml. of water. After heating the reaction mixture at reflux temperature for about 1 hour, it was cooled to room temperature and neutralized with glacial acetic acid. The methyl alcohol was removed under vacuum and 30 ml. of hydrochloric acid in 140 ml. of water added. The mixture was extracted three times with methylene chloride, the extracts washed with water and dried over sodium sulfate. Chromatography over Florisil using Skellysolve B with increasing quantities of acetone as the eluant, gave 1.3 g. of material in the 15% acetone-85% Skellysolve B fraction. The combined fractions were crystallized from acetone to give 800 mg. (4% yield) of 4-fluoro-11β,21-dihydroxy-4,17(20)-[cis]-pregnadien-3-one (IV), which had an infrared spectrum consistent with the proposed structure, ultraviolet absorption $$\lambda_{max.}^{EtOH} \ 249 \ m\mu$$

$a_M$ 14,750 and melted at 170 to 172° C.

*Analysis.*—Calcd. for $C_{21}H_{29}FO_3$: C, 72.38; H, 8.39; F, 5.45. Found: C, 72.26; H, 7.92; F, 5.13.

(b) A solvent system suitable for purifying 4-fluoro-11β,21-dihydroxy-4,17(20)-[cis]-pregnadien-3-one (IV) by countercurrent distribution consisted of 20 ml. of Skellysolve B, 20 ml. of water, 5 ml. of benzene and 80 ml. of acetone. Three grams of the mixture was dissolved in 80 ml. of each layer. The solution was placed in the first eight tubes of a 200 tube machine.

After 200 transfers, analysis by vapor phase chromatography showed a component of unknown structure well separated from IV and another diene-diol. This material (contained in the first 95 tubes) was removed as a solution. The emptied tubes were refilled with fresh solvent and 400 more transfers made. Assay by vapor phase chromatography showed the pure 4-fluoro-11β,21-dihydroxy-4,17(20)-[cis]-pregnadiene-3-one (IV) to be in tubes 107 to 132. The solutions in them were removed and pooled, the organic solvents distilled off under vacuum and the solid residues extracted with methylene chloride. The solvent was removed under vacuum and crystallized from a mixture of acetone and Skellysolve B to give pure 4-fluoro-11β,21-dihydroxy-4,17(20)-[cis]-pregnadien-3-one (IV). The crystals melted at 169.5 to 171° C.

*Analysis.*—Calcd. for $C_{21}H_{29}FO_4$: F, 5.45. Found: F, 5.37.

Following the procedure of Example 4(a) but substituting other alkyl 4α-fluoro-3,11-diketo-5,17(20)-[cis]-pregnadien-21-oates (II) as starting material, also yields 4-fluoro-11β,21-dihydroxy-4,17(20)-[cis]-pregnadien-3-one (IV).

EXAMPLE 5

*4-fluoro-11β,21-dihydroxy-4,17(20)-[cis]-pregnadien-3-one 21-acetate (V)*

To a solution of 800 m. of 4-fluoro-11β,21-dihydroxy-4,17(20)-[cis]-pregnadien-3-one (IV) in 2 ml. of pyridine, 2 ml. of acetic anhydride was added. After standing for about 15 hours at room temperature esterification was completed; ice was added until the exothermic reaction ceased, the reaction mixture was diluted with water, 3 ml. of concentrated hydrochloric acid added and the acid mixture extracted three times with methylene chloride. The combined extracts were washed with a 10% solution of potassium bicarbonate and then water. After drying over sodium sulfate, the solvent was removed under vacuum. The infrared spectrum of the syrup showed the ester band at 1740 cm.$^{-1}$, indicating the product to be 4-fluoro-11β,21-dihydroxy-4,17(20)-[cis]-pregnadien-3-one 21-acetate (V).

Following the procedure of Example 5, but using for the acylation, instead of acetic anhydride, propionic, butyric, hexanoic, isovaleric, β-cyclopentylpropionic, succinic, benzene-sulfonic or other anhydrides, the corresponding 21-propionate, butyrate, hexanoate, isovalerate, β-cyclopentylpropionate, succinate, benzenesulfonate and the like of 4-fluoro-11β,21-dihydroxy-4,17(20)-[cis]-pregnadien-3-one (V) is obtained.

EXAMPLE 6

*4-fluoro-11β,17α,21-trihydroxy-4-pregnene-3,20-dione 21-acetate (VI)*

The non-crystalline 4-fluoro-11β,21-dihydroxy-4,17(20)-[cis]-pregnadien-3-one 21-acetate (V) from Example 5 (850 mg.) was dissolved in 34 ml. of t-butyl alcohol. To this solution, 1 ml. of pyridine was added followed by 2.55 ml. of 2.1 molar N-methylmorpholine oxide peroxide and 17 mg. of osmium tetroxide (added in 8.5 ml. of a 2 mg./ml. solution of t-butyl alcohol). After standing for about 15 hours at room temperature a slight excess of a 1% sodium hydrosulfite solution was added. The solvent was removed under vacuum, the bath temperature being maintained below 45° C. The residue was dissolved in dilute hydrochloric acid (1 part concentrated hydrochloric acid to 10 parts of water) and extracted with methylene chloride. The combined extracts were washed with water and dried over sodium sulfate. Chromatography over Florisil and elution with Skellysolve B containing increasing amounts of acetone gave three fractions which were crystalline and gave a positive Tollens test and absorbed ultraviolet light. The fractions were combined and crystallized from ethyl acetate to give 100 mg. of crystalline 4-fluoro-11β,17α,21-trihydroxy-4-pregnene-3,20-dione 21-acetate (VI), that melted at 190 to 193° C. and had an infrared absorption spectrum consistent with the expected structure and ultraviolet absorption $$\lambda_{max.}^{EtOH}\ 248\ m\mu,\ a_M\ 14{,}850$$

*Analysis.*—Calcd. for $C_{23}H_{31}FO_6$: C, 65.38; H, 7.40; F, 4.50. Found: C, 65.20; H, 7.79; F, 4.27.

Material prepared in the same manner but melting at 193 to 195° C. gave the following analysis. Found: C, 65.40; H, 7.65; F, 4.58.

Following the procedure of Example 6, but instead of 4-fluoro-11β,21-dihydroxy-4,17(20)-[cis]-pregnadien-3-one 21-acetate (V) substituting another corresponding 21-acylate therefor, e.g., one of those disclosed at the end of Example 5, produces the corresponding 4-fluoro-11β,17α,21-trihydroxy-4-pregnene-3,20-dione 21-acylate (VI).

EXAMPLE 7

*4-fluoro-11β,17α,21-trihydroxy-4-pregnene-3,20-dione (VI')*

A current of nitrogen is passed for a period of about 15 minutes through a solution of 50 mg. of 4-fluoro-11β,17α,21-trihydroxy-4-pregnene-3,20-dione 21-acetate (VI) in 1.5 ml. of ethanol. To this solution is then added 0.3 ml. of 95% ethanol containing 30 mg. of potassium carbonate, similarly purged with nitrogen. The mixture is allowed to stand in the nitrogen atmosphere for a period of about 4 hours and then poured into water and neutralized by the addition of 5% hydrochloric acid. The precipitated material is collected on a filter and recrystallized three times from acetone and Skellysolve B to give 4-fluoro-11β,17α,21-trihydroxy-4-pregnene-3,20-dione (VI').

Following the procedure of Example 7, but substituting another 21-acylate of 4-fluoro-11β,17α,21-trihydroxy-4-pregnene-3,20-dione (VI) as starting material, also yields 4-fluoro-11β,17α,21-trihydroxy-4-pregnene-3,20-dione (VI').

EXAMPLE 8

*16-substituted derivatives of the compounds represented by Formulae I to VII of the flow-sheet*

Following the procedures of Examples 1 to 7, but substituting the corresponding 16-substituted compounds (A) for the 16-hydrogen starting materials (A) disclosed therein, yields the 16α- and 16β-methyl, fluoro and chloro counterparts of the steroids prepared in the aforesaid examples. In this manner the following compounds are produced:

methyl-3-ethoxy-11-keto-16α-methyl-3,5(6),17(20)-[cis]-pregnatrien-21-oate (I),
methyl-3-ethoxy-11-keto-16β-methyl-3,5(6),17(20)-[cis]-pregnatrien-21-oate (I),
methyl-3-ethoxy-11-keto-16α-fluoro-3,5(6),17(20)-[cis]-pregnatrien-21-oate (I),
methyl-3-ethoxy-11-keto-16α-chloro-3,5(6),17(20)-[cis]-pregnatrien-21-oate (I),
methyl-3-ethoxy-11-keto-16β-fluoro-3,5(6),17(20)-[cis]-pregnatrien-21-oate (I),
methyl-3-ethoxy-11-keto-16β-chloro-3(5(6),17(20)-[cis]-pregnatrien-21-oate (I),
methyl-4α-fluoro-3,11-diketo-16α-methyl-5,17(20)-[cis]-pregnadien-21-oate (II),
methyl-4α-fluoro-3,11-diketo-16β-methyl-5,17(20)-[cis]-pregnadien-21-oate (II),
methyl-4α,16α-difluoro-3,11-diketo-5,17(20)-[cis]-pregnadien-21-oate (II),
methyl-4α-fluoro-16α-chloro-3,11-diketo-5,17(20)-[cis]-pregnadien-21-oate (II),
methyl-4α,16β-difluoro-3,11-diketo-5,17(20)-[cis]-pregnadien-21-oate (II),
methyl-4α-fluoro-16β-chloro-3,11-diketo-5,17(20)-[cis]-pregnadien-21-oate (II),
methyl-4-fluoro-3,11-diketo-16α-methyl-4,17(20)-[cis]-pregnadien-21-oate (VII),
methyl-4-fluoro-3,11-diketo-16β-methyl-4,17(20)-[cis]-pregnadien-21-oate (VII),
methyl-4,16α-difluoro-3,11-diketo-4,17(20)-[cis]-pregnadien-21-oate (VII),
methyl-4-fluoro-16α-chloro-3,11-diketo-4,17(20)-[cis]-pregnadien-21-oate (VII),
methyl-4,16β-difluoro-3,11-diketo-4,17(20)-[cis]-pregnadien-21-oate (VII),
methyl-4-fluoro-16β-chloro-3,11-diketo-4,17(20)-[cis]-pregnadien-21-oate (VII),
4-fluoro-β,21-dihydroxy-16α-methyl-4,17(20)-[cis]-pregnadien-3-one (IV),
4-fluoro-11β,21-dihydroxy-16β-methyl-4,17(20)-[cis]-pregnadien-3-one (IV),
4,16α-difluoro-11β,21-dihydroxy-4,17(20)-[cis]-pregnadien-3-one (IV),
4-fluoro-16α-chloro-11β,21-dihydroxy-4,17(20)-[cis]-pregnadien-3-one (IV),
4,16β-difluoro-11β,21-dihydroxy-4,17(20)-[cis]-pregnadien-3-one (IV),
4-fluoro-16β-chloro-11β,21-dihydroxy-4,17(20)-[cis]-pregnadien-3-one (IV),
4-fluoro-11β,21-dihydroxy-16α-methyl-4,17(20)-[cis]-pregnadien-3-one 21-acetate (V),
4-fluoro-11β,21-dihydroxy-16β-methyl-4,17(20)-[cis]-pregnadien-3-one 21-acetate (V),
4,16α-difluoro-11β,21-dihydroxy-4,17(20)-[cis]-pregnadien-3-one 21-acetate (V),
4-fluoro-16α-chloro-11β,21-dihydroxy-4,17(20)-[cis]-pregnadien-3-one 21-acetate (V),
4,16β-difluoro-11β,21-dihydroxy-4,17(20)-[cis]-pregnadien-3-one 21-acetate (V),
4-fluoro-16β-chloro-11β,21-dihydroxy-4,17(20)-[cis]-pregnadien-3-one 21-acetate (V),
4-fluoro-16α-methyl-11β,17α,21-trihydroxy-4-pregnene-3,20-dione 21-acetate (VI),
4-fluoro-16β-methyl-11β,17α,21-trihydroxy-4-pregnene-3,20-dione 21-acetate (VI),
4,16α-difluoro-11β,17α,21-trihydroxy-4-pregnene-3,20-dione 21-acetate (VI),
4-fluoro-16α-chloro-11β,17α,21-trihydroxy-4-pregnene-3,20-dione 21-acetate (VI),
4,16β-difluoro-11β,17α,21-trihydroxy-4-pregnene-3,20-dione 21-acetate (VI),
4-fluoro-16β-chloro-11β,17α,21-trihydroxy-4-pregnene-3,20-dione 21-acetate (VI), 4-fluoro-16α-methyl-11β,17α,21-trihydroxy-4-pregnene-3,20-dione (VI'),
4-fluoro-16β-methyl-11β,17α,21-trihydroxy-4-pregnene-3,20-dione (VI'),
4,16α-difluoro-11β,17α,21-trihydroxy-4-pregnene-3,20-dione (VI'),
4-fluoro-16α-chloro-11β,17α,21-trihydroxy-4-pregnene-3,20-dione (VI'),
4,16β-difluoro-11β,17α,21-trihydroxy-4-pregnene-3,20-dione (VI') and
4-fluoro-16β-chloro-11β,17α,21-trihydroxy-4-pregnene-3,20-dione (VI').

We claim:
1. Compounds of the formula

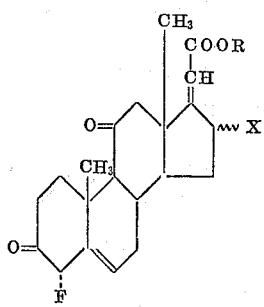

wherein R is a lower-alkyl radical containing from one to eight carbon atoms, inclusive, and X is selected from the group consisting of hydrogen, methyl, fluorine and chlorine.

2. Methyl 4α-fluoro-3,11-diketo-5,17(20)-[cis]-pregnadien-21-oate of the formula

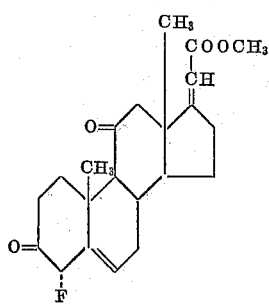

3. Compounds of the formula

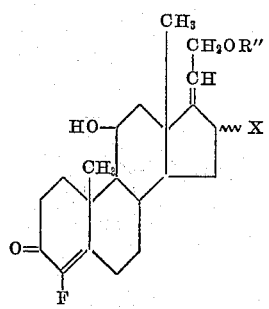

wherein R'' is selected from the group consisting of hydrogen and the lower-acyl radical of a hydrocarbon carboxylic acid containing from one to twelve carbon atoms, inclusive, and X is selected from the group consisting of hydrogen, methyl, fluorine and chlorine.

4. 4-fluoro-11β,21-dihydroxy-4,17(20)-[cis]-pregnadien-3-one of the formula

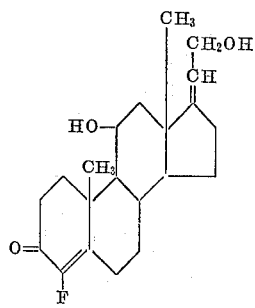

5. 4-fluoro-11β,21-dihydroxy-4,17(20)-[cis]-pregnadien-3-one 21-acetate of the formula

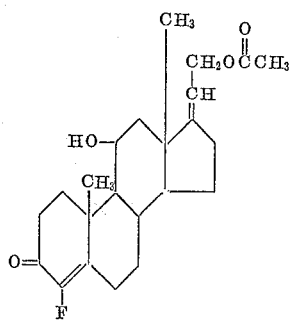

6. A process for the production of compounds of the formula (VI)

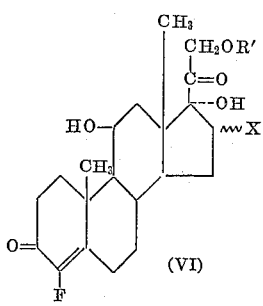

wherein R' is the lower-acyl radical of an organic carboxylic acid containing from one to twelve carbon atoms, inclusive, and X is selected from the group consisting of hydrogen, methyl, fluorine and chlorine, which comprises:
(1) treating with perchloryl fluoride a compound of the Formula I

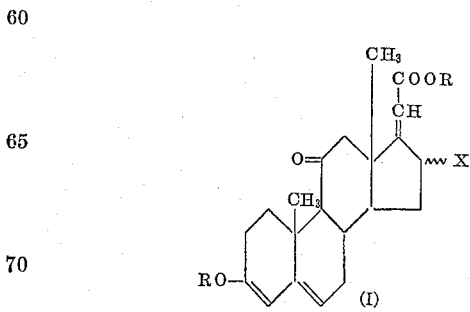

wherein R is a lower-alkyl radical containing from one to eight carbon atoms, inclusive, and X has the same meanings as above to give compounds of the Formulae II and III

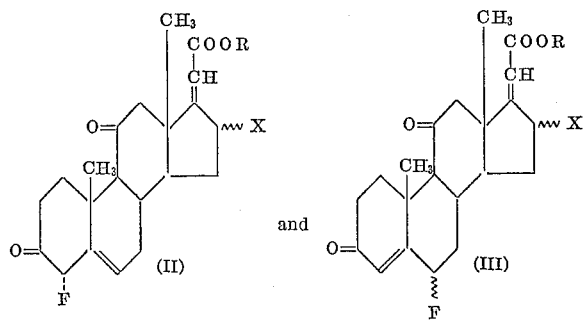

wherein R has the same meaning as at the 21-position, above, and X has the same meanings as above; (2) treating a thus produced compound of Formula II with a secondary alkylene amine to yield a corresponding 3-enamine derivative, (3) followed by reduction thereof at the 11- and 21-positions to produce a corresponding 11β,21-dihydroxy compound and (4) hydrolyzing the enamine group at the 3-position of a thus produced compound to yield a corresponding compound of Formula IV

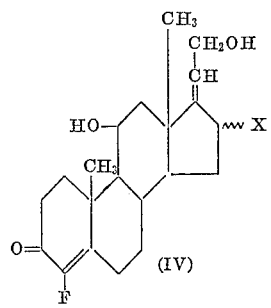

wherein X has the same meanings as above; (5) esterifying at the 21-position the thus produced compound of Formula IV to yield a corresponding compound of Formula V

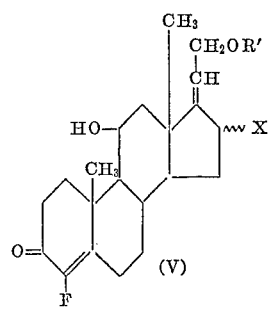

wherein R' and X have the same meanings as above, and (6) subjecting to oxidative hydroxylation a thus produced compound of Formula V to yield a corresponding compound of Formula VI, above.

7. A process for the production of the compound of Formula VI

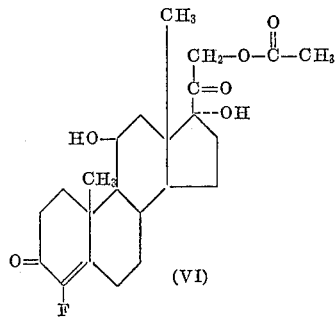

which comprises: (1) treating with perchloryl fluoride the compound of the Formula I

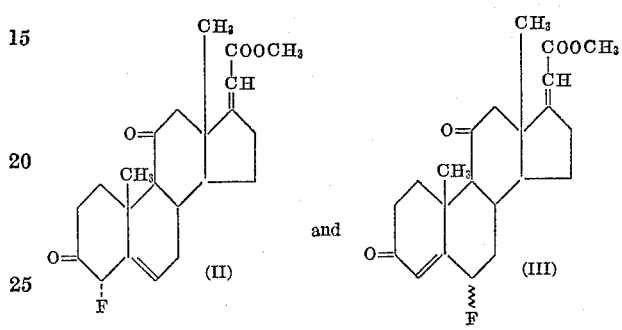

to give the compounds of the Formulae II and III

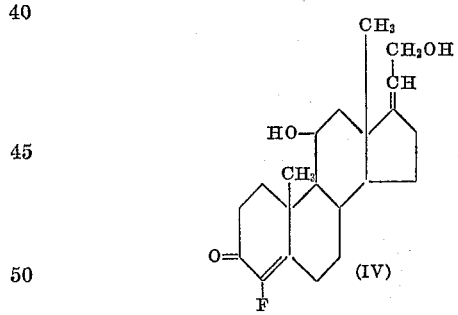

(2) subjecting the thus produced compound of Formula II to treatment with pyrrolidine in the presence of p-toluenesulfonic acid to yield the corresponding 3-pyrrolidyl enamine derivative, (3) followed by reaction of the thus produced 3-pyrrolidyl enamine with lithium aluminum hydride to produce the corresponding 11β,21-dihydroxy compound and (4) hydrolyzing the enamine group at the 3-position of the thus produced compound with methanol and sodium hydroxide to yield the compound of Formula IV

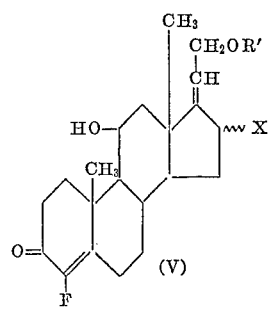

(5) esterifying at the 21-position the thus produced compound of Formula IV with acetic anhydride in the presence of pyridine to yield the compound of Formula V

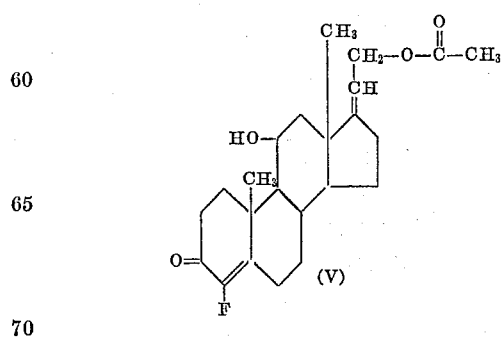

and (6) subjecting the thus produced compound of Formula V to treatment with osmium tetroxide and N-methylmorpholine oxide peroxide to yield the compound of Formula VI, above.

8. A process for the production of the compound of the Formula VI

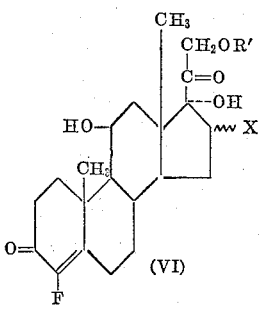

wherein R' is the lower-acyl radical of an organic carboxylic acid containing from one to twelve carbon atoms, inclusive, and X is selected from the group consisting of hydrogen, methyl, fluorine and chlorine, which comprises: (1) treating a compound of the Formula II

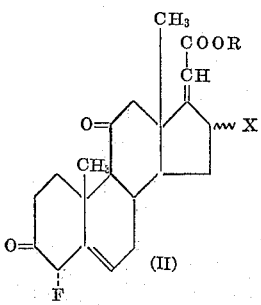

wherein R is a lower-alkyl radical containing from one to eight carbon atoms, inclusive, and X has the same meanings as above, with a secondary alkylene amine to yield the corresponding 3-enamine derivative, (2) followed by reduction thereof at the 11- and 21-positions to produce a corresponding 11β,21-dihydroxy compound and (3) hydrolyzing the enamine group at the 3-position of a thus produced compound to give a corresponding compound of the Formula IV

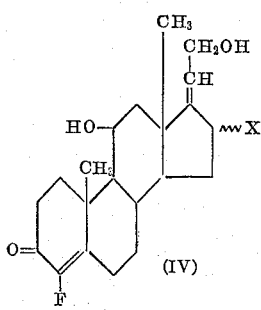

wherein X has the same meanings as above; (4) esterifying at the 21-position the thus produced compound of Formula IV to yield a corresponding compound of the Formula V

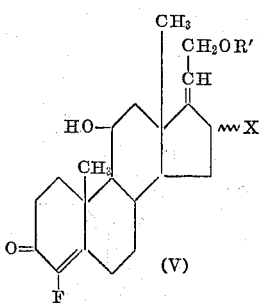

wherein R' and X have the same meanings as above, and (5) subjecting to oxidative hydroxylation a thus produced compound of Formula V to yield a corresponding compound of Formula VI, above.

9. A process for the production of the compound of Formula VI

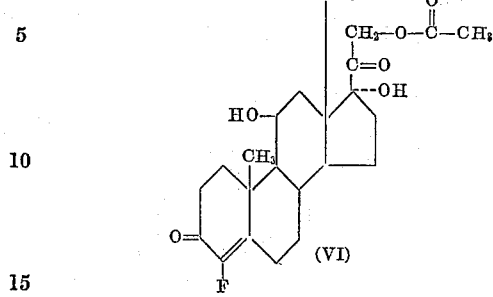

which comprises: (1) subjecting the compound of Formula II

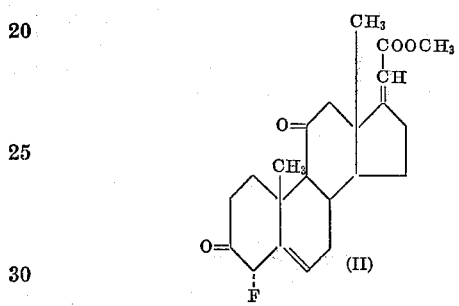

to treatment with pyrrolidine in the presence of p-toluenesulfonic acid to yield the corresponding 3-pyrrolidyl enamine derivative, (2) followed by reaction of the thus produced 3-pyrrolidyl enamine with lithium aluminum hydride to produce the corresponding 11β,21-dihydroxy compound and (3) hydrolyzing the enamine group at the 3-position of the thus produced compound with methanol and sodium hydroxide to yield the compound of Formula IV

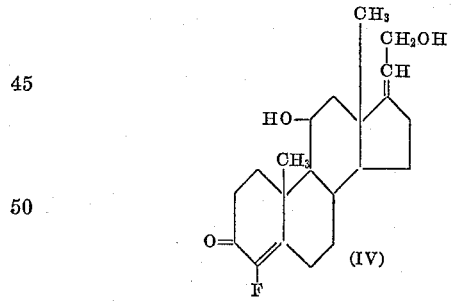

(4) esterifying at the 21-position the thus produced compound of Formula IV with acetic anhydride in the presence of pyridine to yield the compound of Formula V

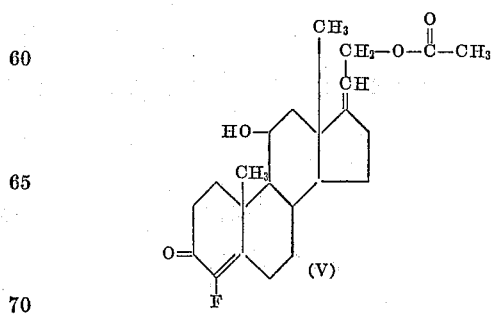

and (5) subjecting the thus produced compound of Formula V to treatment with osmium tetroxide and N-methylmorpholine oxide peroxide to yield the compound of Formula VI, above.

10. A process for the production of compounds of the Formulae II and III

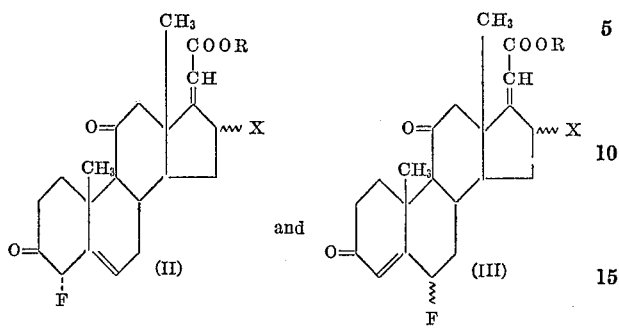

wherein R is a lower-alkyl radical containing from one to eight carbon atoms, inclusive, and X is selected from the group consisting of hydrogen, methyl, fluorine and chlorine, which comprises treating with perchloryl fluoride a compound of the Formula I

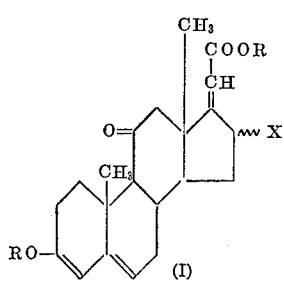

wherein R at the 21-position has the value corresponding to that in the same position in Formulae II and III, above, and R at the 3-position is any lower-alkyl radical of from one to eight carbon atoms, inclusive, and X has the same meanings as above.

11. A process for the production of compounds of the Formulae II and III

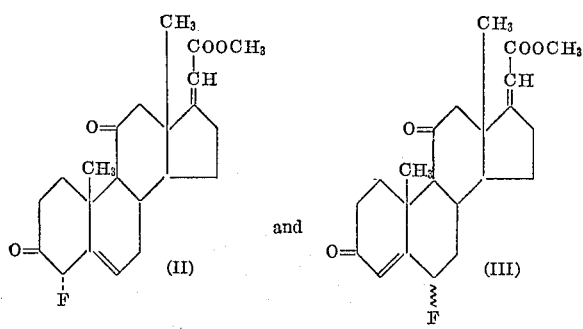

which comprises treating with perchoryl fluoride the compound of the Formula I

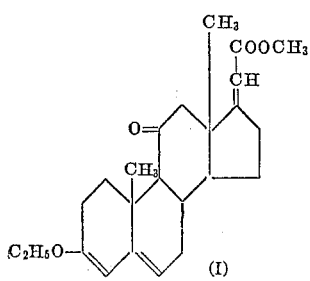

12. A process for the production of a compound of the Formula IV

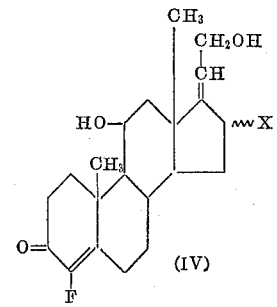

wherein X is selected from the group consisting of hydrogen, methyl, fluorine and chlorine, which comprises: (1) treating with perchloryl fluoride a compound of the Formula I

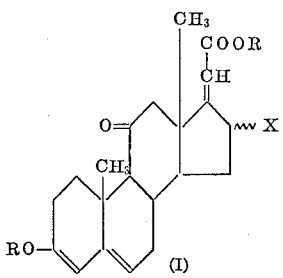

wherein R is a lower-alkyl radical containing from one to eight carbon atoms, inclusive, and X has the same meanings as above, to give compounds of the Formulae II and III

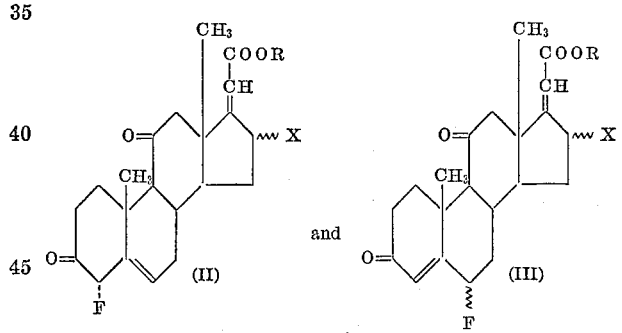

wherein R has the value corresponding to that in the 21-position in Formula I, above, and X has the same meanings as above, and (2) treating a thus produced compound of Formula II with a secondary alkylene amine to yield a corresponding 3-enamine derivative, (3) followed by reduction thereof at the 11- and 21-positions to produce a corresponding 11β,21-dihydroxy compound and (4) hydrolyzing the enamine group at the 3-position of a thus produced compound to yield a corresponding compound of Formula IV, above.

13. A process for the production of the compound of Formula IV

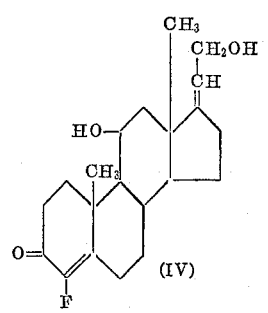

which comprises: (1) treating with perchloryl fluoride the compound of the Formula I

17

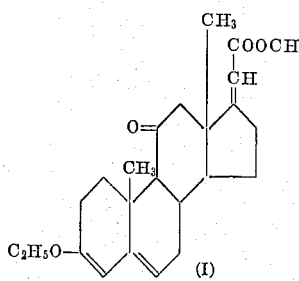

to give compounds of the Formulae II and III

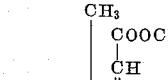

and (2) subjecting the thus produced compound of Formula II to treatment with pyrrolidine in the presence of p-toluenesulfonic acid to yield the corresponding 3-pyrrolidyl enamine derivative, (3) followed by reaction of the thus produced 3-pyrrolidyl enamine with lithium aluminum hydride to produce the corresponding 11β,21-dihydroxy compound and (4) hydrolyzing the enamine group at the 3-position of the thus produced compound with methanol and sodium hydroxide to yield the compound of Formula IV, above.

14. A process for the production of a compound of the Formula IV

18

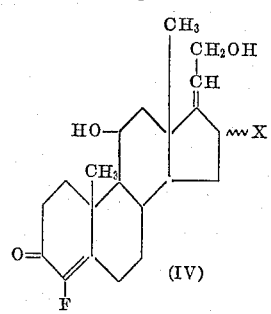

wherein X is selected from the group consisting of hydrogen, methyl, fluorine and chlorine, which comprises (1) treating a compound of the Formula II

wherein R is a lower-alkyl radical containing from one to eight carbon atoms, inclusive, and X has the same meanings as above, with a secondary alkylene amine to yield the corresponding 3-enamine derivative, (2) followed by reduction thereof at the 11- and 21-positions to produce a corresponding 11β,21-dihydroxy compound and (3) hydrolyzing the enamine group at the 3-position of a thus produced compound to produce a corresponding compound of Formula IV, above.

References Cited by the Examiner
UNITED STATES PATENTS 2,769,823 11/56 Schneider et al. _____ 260—397.45
3,069,413 12/62 Zderic et al. _____ 260—239.5

LEWIS GOTTS, *Primary Examiner.*

UNITED STATES PATENT OFFICE
CERTIFICATE OF CORRECTION

Patent No. 3,169,131                                      February 9, 1965

Fred Kagan et al.

It is hereby certified that error appears in the above numbered patent requiring correction and that the said Letters Patent should read as corrected below.

Column 3, line 6, for "-3,1-diketo" read -- -3,11-diketo --; line 24, for "11β-21-" read -- 11β,21-" column 5, line 4, for "-20°" read -- -21° --; column 6, line 53, for "800 m." read -- 800 mg. --; column 8, line 13, for "3(5(6)" read -- 3,5(6) --; line 40, for "4-fluoro-β,21-" read -- 4-fluoro-11β,21- --.

Signed and sealed this 23rd day of November 1965.

(SEAL)
Attest:

ERNEST W. SWIDER                                  EDWARD J. BRENNER
Attesting Officer                                      Commissioner of Patents